United States Patent [19]
Mooney et al.

[11] Patent Number: 6,119,847
[45] Date of Patent: Sep. 19, 2000

[54] FOLDING AUGER

[75] Inventors: R. Shawn Mooney, Southey; Bradley Zazula, Regina, both of Canada

[73] Assignee: Brandt Industries Ltd., Canada

[21] Appl. No.: 09/258,297

[22] Filed: Feb. 26, 1999

[51] Int. Cl.[7] .......................... B65G 21/10; B65G 15/26; B65G 17/28; B65G 21/14; B65G 41/00
[52] U.S. Cl. .......................................... 198/632; 198/313
[58] Field of Search ................................... 198/313, 632, 198/861.2

[56] References Cited

U.S. PATENT DOCUMENTS

| | | |
|---|---|---|
| 3,337,068 | 8/1967 | Meharry . |
| 3,550,793 | 12/1970 | Davidow et al. . |
| 3,770,101 | 11/1973 | Carlson .................................. 198/632 |
| 3,844,433 | 10/1974 | Laajala . |
| 3,863,783 | 2/1975 | Spellman, Jr. . |
| 3,979,152 | 9/1976 | Morey et al. . |
| 4,245,732 | 1/1981 | Couperus . |
| 4,427,104 | 1/1984 | Reid, Jr. .............................. 198/313 X |
| 4,427,105 | 1/1984 | Hawley et al. . |
| 4,530,429 | 7/1985 | Erickson . |
| 4,659,262 | 4/1987 | Van Aalst . |
| 4,669,945 | 6/1987 | Pollard et al. ...................... 198/313 X |
| 4,836,621 | 6/1989 | Warsaw ............................... 198/313 X |
| 5,044,484 | 9/1991 | Douglas . |
| 5,333,725 | 8/1994 | Douglas . |
| 5,443,351 | 8/1995 | Pettijohn . |
| 5,516,253 | 5/1996 | Linscheid et al. .................. 198/313 X |
| 5,819,950 | 10/1998 | McCloskey .......................... 198/313 X |

*Primary Examiner*—Christopher P. Ellis
*Assistant Examiner*—Gene O. Crawford
*Attorney, Agent, or Firm*—Adrian Zahl

[57] ABSTRACT

A conveyor for transporting grain or the like consists of three or more sections foldable about two axes of rotation displaced from each other. Separate retractors operate to fold the conveyor about the two axes. A link connecting the first and second retractors permits a single actuator to fully fold the conveyor about the two axes. The first and second axes may be rotationally displaced from each other by about 90°.

14 Claims, 6 Drawing Sheets

FOLDING AUGER

FIELD OF THE INVENTION

The invention relates to materials transport, such as grain or the like. In particular, the invention relates to a foldable auger, comprising an auger tube and auger flighting, for use in transporting grain or other particulate or fluid material. The auger comprises three or more sections that may be folded in on themselves for transport or storage, with the folding being actuated by a single hydraulic cylinder or other like actuating means.

BACKGROUND OF THE INVENTION

In a mobile conveying apparatus, for example a transportable grain auger apparatus, it is desirable to provide a means whereby a lengthy elongate conveyor may be folded for storage and transport. Typical grain conveyors incorporate a lengthy auger, comprising an auger tube, auger flighting and drive means for rotating the auger. It can be awkward to transport and store such apparatus. Foldable conveyors, including foldable augers, are known in the prior art. For example, U.S. Pat. No. 3,337,068 (Meharry) discloses an auger arrangement, wherein the main auger flighting and housing is foldable in two parts about a central hinged joint. The respective auger flightings in the first and second parts are keyed together when the auger is unfolded for use to permit the flighting in the first part to rotatably drive the flighting of the second part. One drawback of the arrangement disclosed in this reference is that the operator is required to manually fold the auger, which may be difficult if the auger is heavy or is positioned inaccessibly. As well, two-part folding of the auger may not sufficiently compact the unit for transport or storage. The first drawback has been addressed in the art by providing a power-driven arrangement for folding an auger or other conveyor. For example, U.S. Pat. No. 3,550,793 (Davidow et al.) discloses a folding auger, wherein the folding and unfolding operation is driven by a hydraulic cylinder. A similar arrangement is shown in U.S. Pat. No. 4,427,105 (Hawley et al.).

It is further known to provide conveyors foldable in three or more parts to provide for more compact storage or transport. For example, U.S. Pat. No. 4,659,262 (van Aalst) discloses a pneumatic duct foldable in three parts, and supported by a folding, hydraulically driven exterior frame. Folding of the frame is effected by a separate hydraulic cylinder mounted at each fold.

It is desirable to provide an auger-type conveyor that is foldable in three or more sections into a relatively compact unit, and wherein a single hydraulic cylinder or other motive force effects the folding operation. The use of a single cylinder, rather than a separate cylinder at each joint, reduces the cost and complexity of the device and also permits a coordinated folding operation of the conveyor without the need for controlling and coordinating multiple hydraulic cylinders. Such an operation is possible through the use of tie rods that link adjacent conveyor sections, with a single hydraulic cylinder serving both to drive the folding of adjacent sections and actuate the tie rod or rods.

It is also desirable to provide a conveyor foldable in three or more sections, wherein the folding occurs on intersecting planes. Thus, for example, a proximal and middle conveyor section might fold on a horizontal plane and the distal section fold on a vertical plane. This arrangement can permit a more compact folding of the conveyor, and is particularly useful where the conveyor extends from a large piece of equipment such as a grain vacuum device. In this case, the proximal sections of the conveyor should fold in a vertical plane to permit a section of the conveyor to rest on top of the equipment, while the distal conveyor section is conveniently folded on a horizontal plane, in order that it may lie beside the proximal folded sections of the conveyor.

The terms "proximal" and "distal" used herein are directional references referring to positions close to and distant from, respectively, the attachment point or base of the auger.

SUMMARY OF THE INVENTION

It is an object of the present invention to provide conveyor and conveyor housing foldable in three or more parts, and wherein folding is effected by means of a single hydraulic or pneumatic cylinder or other actuator means. It is a further object to provide a folding conveyor, wherein the proximal sections of the conveyor housing fold along a first plane and the distal section folds on a second plane generally interesting to the first plane.

The invention comprises in one aspect a conveyor apparatus comprising an elongate conveyor housing and material transport means within the housing and comprising first, second and third conveyor sections pivotally joined together, foldable about first and second pivot means between an extended coaxial arrangement and a folded non-coaxial arrangement and forming when fully extended, a unitary conveyor;

first retraction means connected to the second section to fold the first and second sections about a first axis;

second retraction means associated with said third section to fold said third section relative to said second section about a second axis; and linkage means associated with the first and second retraction means whereby the first retraction means operatively drives said second retraction means to fold said third section relative to said second section.

Preferably, the second axis is rotationally displaced from the first axis by about 90°.

In another aspect, the housing sections are joined together by first and second hinges, each comprising first and second hinge legs. Each of the hinge legs has a first end pivotally mounted to a respective conveyor housing section inboard of a corresponding end of said housing, and a second end meeting at an apex of said hinge wherein said legs are pivotally jointed together at said apex, said hinge forming a generally triangular structure with said conveyor to longitudinally displace said sections apart from each other as said sections are folded about said hinge. The first retraction means may be pivotally mounted at an end thereof to said first hinge at generally the apex thereof.

Conveniently, the linkage means comprises a tie rod having first and second ends, said first end mounted to said first conveyor section and said second end pivotally mounted to the third conveyor section.

In a further aspect, the invention comprises an auger comprising an auger housing and an auger flighting, said auger being foldable in at least three sections and comprising:

retraction means associated with said first and second sections and operable between first and second positions whereby in said first position said first and second sections are fully extended and in said second position said sections are folded about a first axis;

second retraction means associated with said third section and operable between first and second positions whereby in said first position said third auger section is fully extended to relative to said second section and in said second position, said third section is folded relative to said second section about a second axis; and linkage means associated with said first and second retraction means whereby actuation of said first retraction means by said actuator operates said second retraction means between said first and second positions.

The present invention will now be described by way of a preferred embodiment.

DETAILED DESCRIPTION OF THE PREFERRED EMBODIMENT

Figure 1:
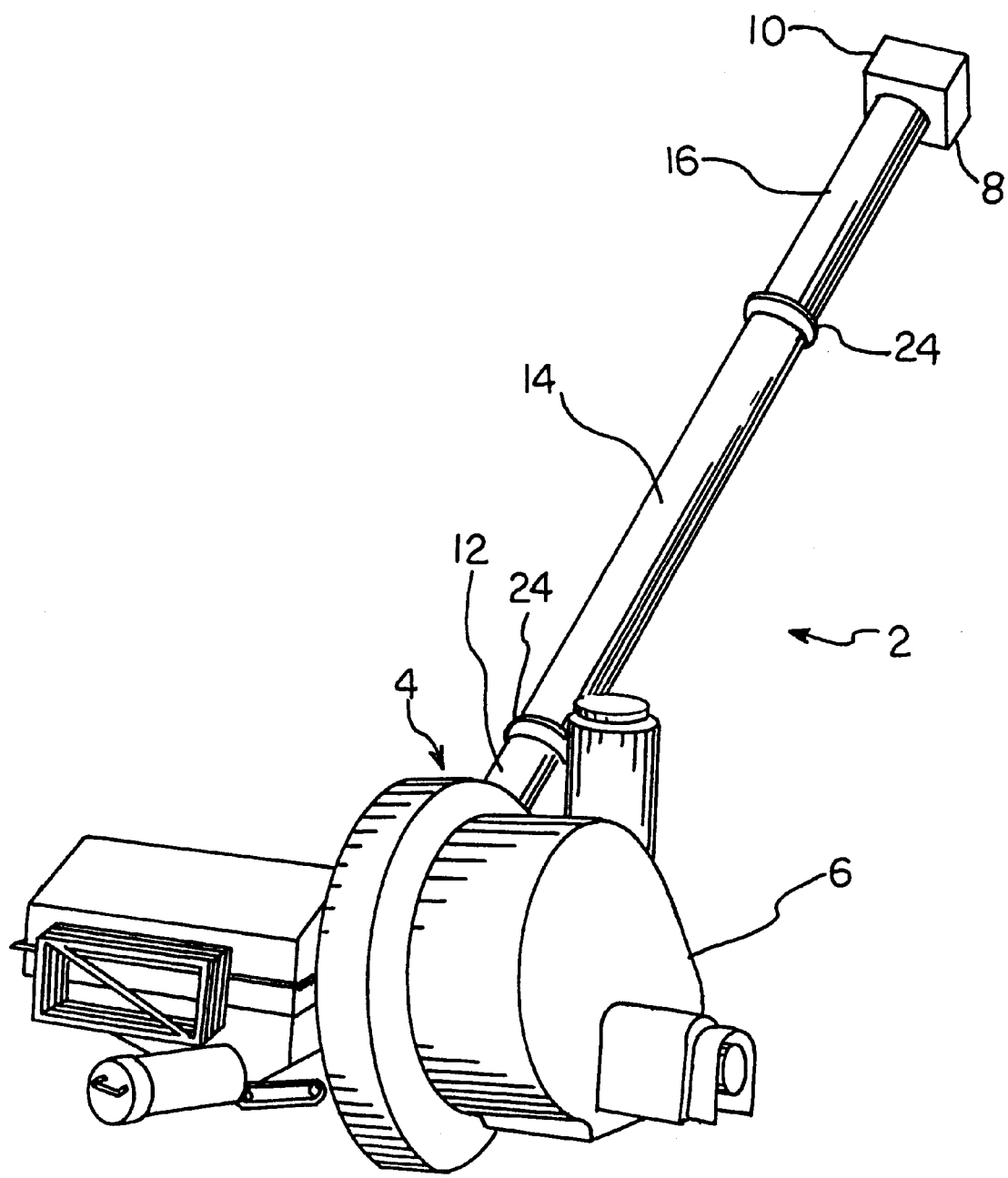
FIG. 1 is a perspective view of an auger according to the present invention, in extended position and mounted to a grain vacuum apparatus, with the auger-folding means removed for illustration of the auger components.
Figure 2:
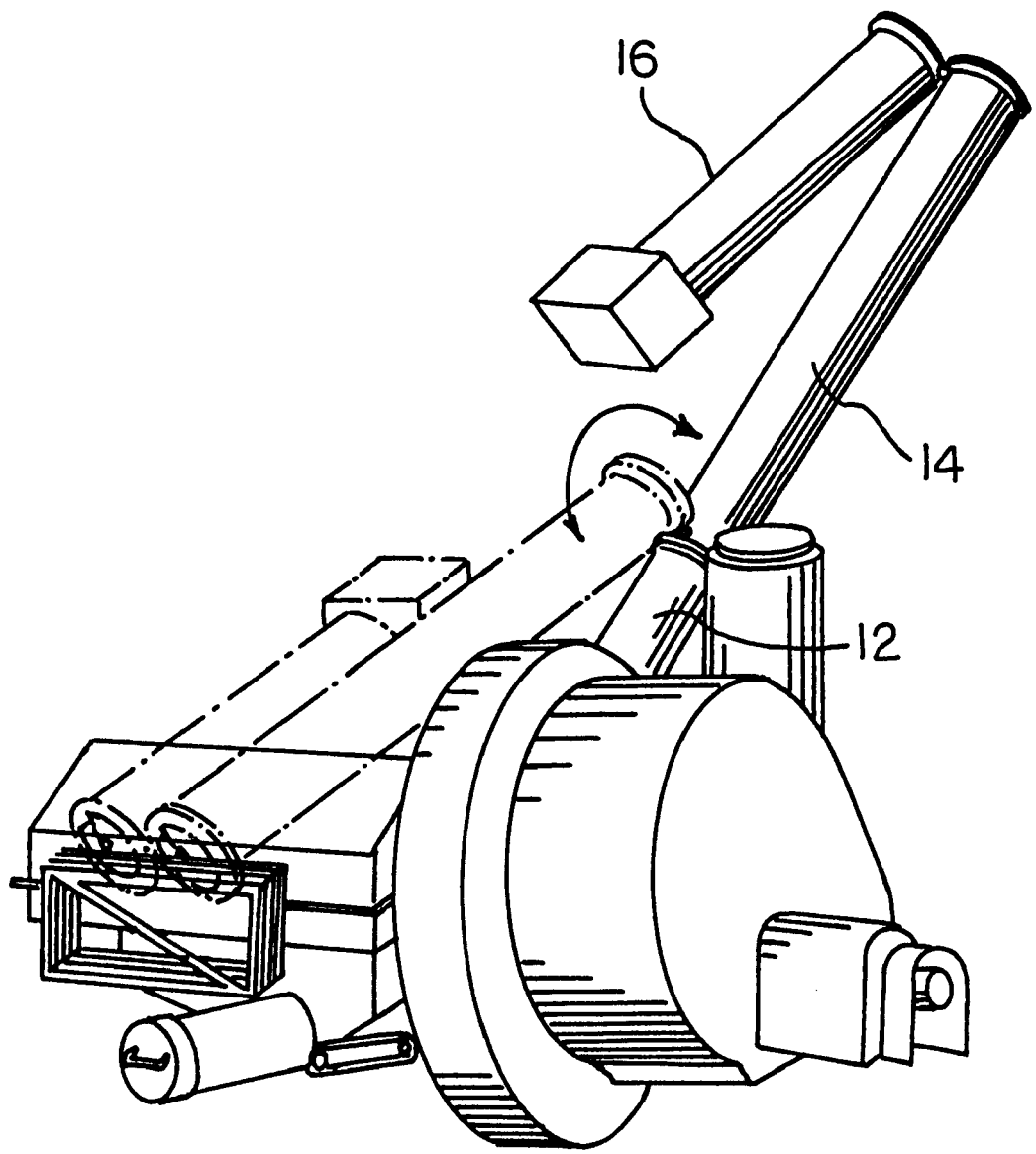
FIG. 2 is a perspective view as in FIG. 1, illustrating the auger in a partly folded position.
Figure 3:
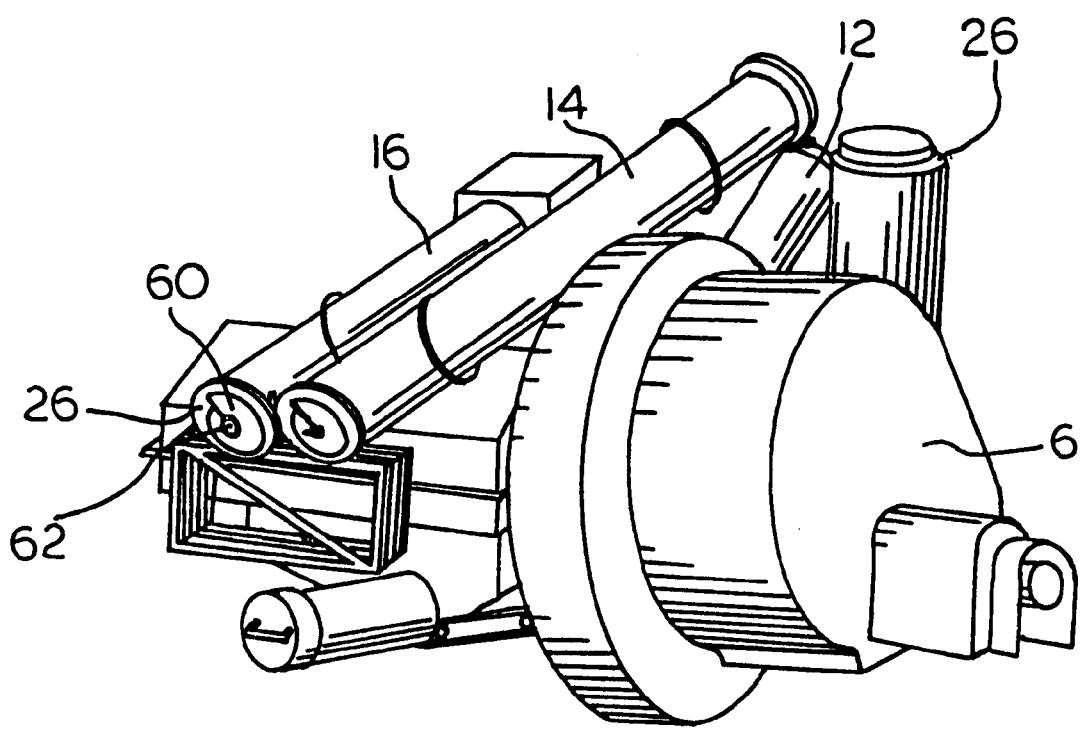
FIG. 3 is a perspective view, showing the auger in folded position.

FIGS. 1 to 3 show an auger tube, mounted to a grain vacuum apparatus, in fully-extended, partly folded and fully folded positions, respectively. The auger tube 2 is mounted at its proximal end 4 to grain vacuum apparatus 6 with the interior of the auger operatively communicating with the vacuum apparatus. It will be seen that the auger tube may be mounted to any suitable base or equipment article. The distal end 8 of the auger tube features an intake nozzle 10. The preferred embodiment of the invention comprises a three-part folding auger, comprised of a proximal section 12, middle section 14, and distal section 16. Each auger tube houses a corresponding auger flighting, as will be illustrated and discussed in greater detail below. The auger flightings are keyed together for common rotatable operation. In the fully-extended position of FIG. 1, the auger effectively comprises a linear, unitary auger structure.

During the folding process, as illustrated by the partly-folded position of FIG. 2, it will be seen that the proximal auger section 12 remains stationary, while the middle section 14 is pivoted about a generally horizontal axis (i.e. the section travels within a generally vertical plane) and the distal section 16 is pivoted about an axis generally transverse to the axis of rotation of the middle section. FIG. 2 shows in dotted lines the auger in the fully folded position, which is further seen more particularly in FIG. 3. The transverse axes of folding permits the middle and distal sections to pivot within intersecting planes, permitting them to lie generally side by side on the upper surface of the grain vacuum apparatus, as seen in FIG. 3. This permits compact storage and transportation of the device.

The respective auger housings each feature a flange 24 at an end of the housing for contact with an abutting housing. The flanges 24 each have a mating surface 26 for contact with an abutting flange. The flanges 24 permit the housings 12–16 to generally sealingly engage each other when the apparatus is in its extended, operating position.

Figure 4:
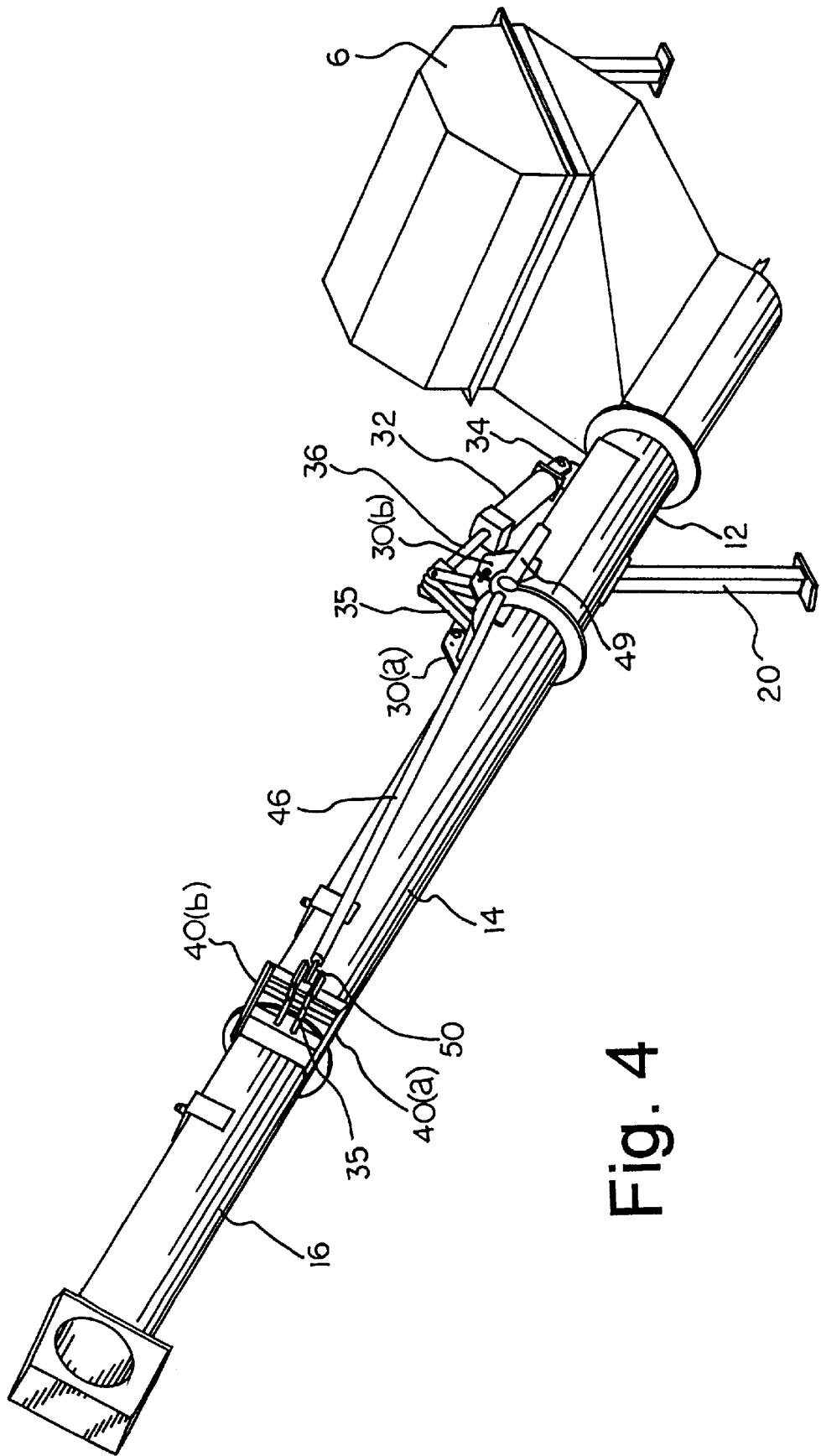
FIG. 4 is a further perspective view of the device in the extended position.
Figure 5:
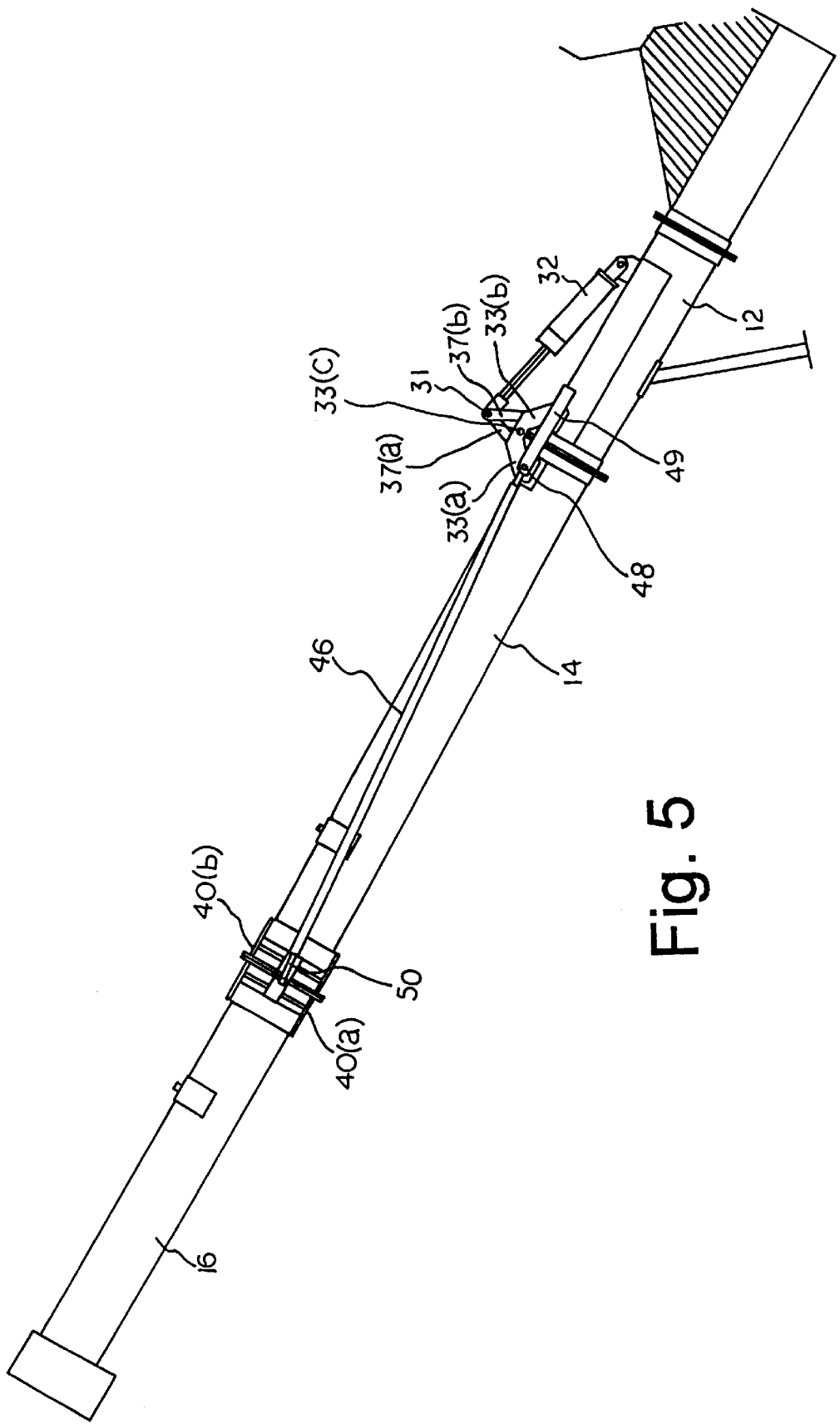
FIG. 5 is a side elevational view of the device in the extended position.
Figure 6:
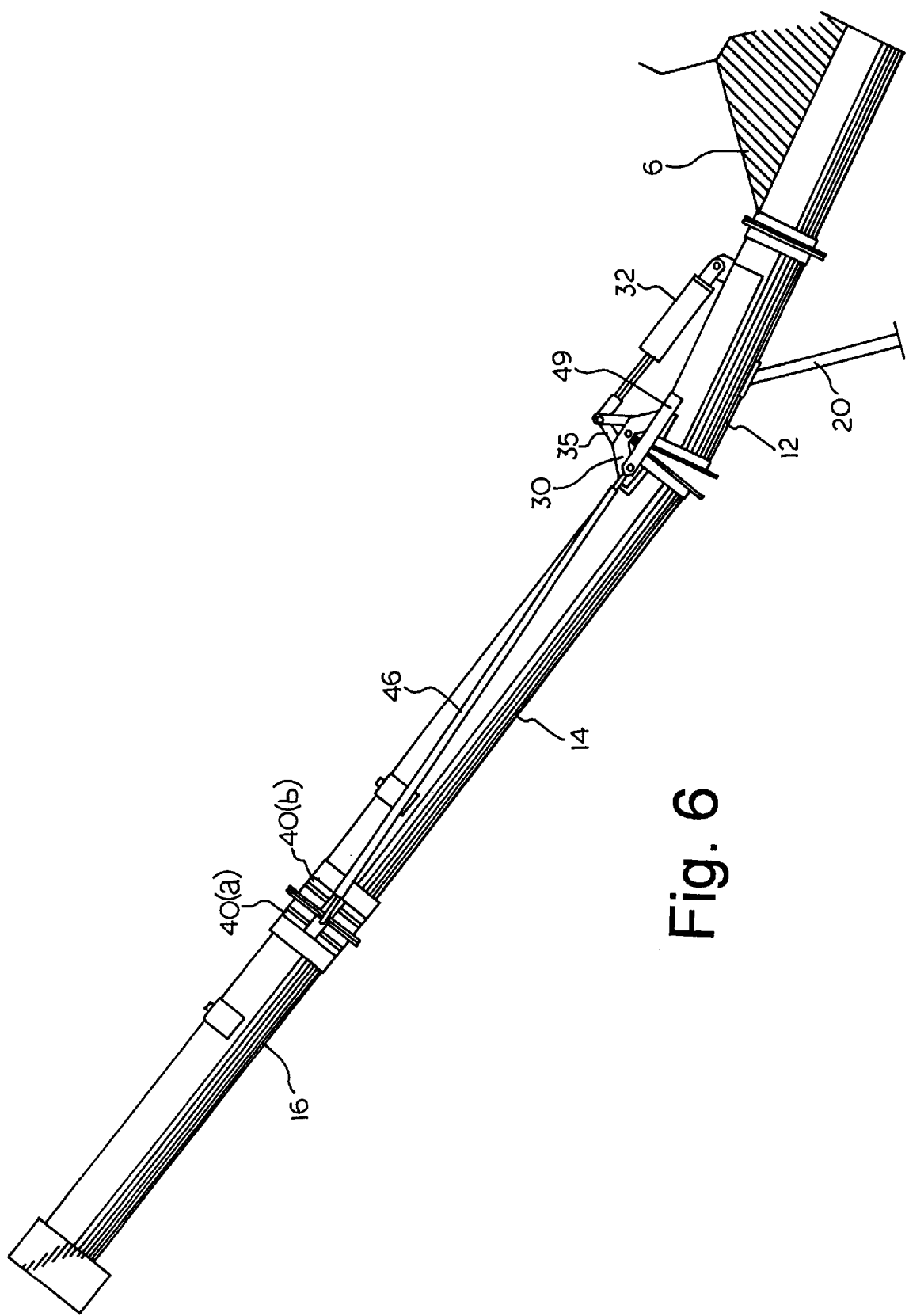
FIG. 6 is a side elevational view of the device in a partly-folded position.

Turning to FIGS. 4–6, adjacent auger housings 12 to 16 are hinged together by means of paired external hinge sets 30 and 40, joining the sections 12 and 14 (hinge 30) and 14 and 16 (hinge 40). Each hinge set 30 and 40 consists of paired scissors hinges (a) and (b) mounted adjacent to each other, in parallel spaced relation. Each hinge (a) and (b) comprises first and second folding legs 33(a) and 33(b), respectively, joined centrally by a pivot joint 33(c). The respective free ends of the legs are each pivotally mounted to a corresponding auger housing section. A central folding arm 35 is disposed between the hinges 30, the respective ends of the arm being each mounted to adjacent section. The arm extends outwardly from the auger tube to form a tentlike hinge structure, the apex of the structure comprising a pivot joint 31 joining first and second limbs 37(a) and (b) of the arm pivotally together. The arm 35 thus folds and unfolds in concert with the relative movement of the corresponding auger housing sections.

The folding action of the proximal and middle auger sections is driven by a hydraulic piston 32 pivotally mounted at its stationary end to the proximal housing 12 by way of pivot mount 34. The actuator rod 36 of hydraulic piston 32 is pivotally mounted at its distal end to the pivot joint 31 of the folding arm 35. It will be seen that retraction of rod 36 draws the apex of arm 35 proximally towards the proximate end of the conveyor, thus rotating the middle conveyor section 14 about a generally vertical plane into a folded position. Extension of hydraulic piston 36 achieves the opposite motion, unfolding the middle section 14. As the housing sections unfold, they diverge apart from each other. This function results from the pivotal mounting of the legs 33 and 37 whereby the respective mounts are displaced from the joint between respective adjacent housing sections.

The proximal and distal housing sections are linked by tie rod 46. A rigid elongate tie rod mount plate 49 is mounted at one end to the proximate housing 12, and parallel thereto. The second end of the tie rod mount plate extends outwardly past the distal end of the housing section 12. The proximal end of the tie rod 46 is pivotally mounted by way of pivot joint 48 to the second end of the mount 49. The distal end of the tie rod 46 is pivotally mounted at pivot joint 31 to the apex of folding arm 35 on the distal housing section 16. It will be seen that as the proximal and middle housing sections are folded together by the retraction of piston 32, and the respective housings diverge, the tie rod 46 will be retracted longitudinally relative to the middle and distal housings. The retractive displacement of the rod 46 urges the apex of the hinge 30(b) in a proximal direction. This in turn folds the distal auger section 16 inwardly towards the middle auger section.

The hinges 30 and 40 are mounted such that their respective apices are displaced by about 90° relative to each other. Thus, in the preferred version, the hinge 30 extends generally upwardly from the auger tube while the hinge 40 extends generally horizontally from the auger tube. The rotational displacement of the respective hinges permits the distal auger section 16 to be folded about a plane generally transverse to the plane of folding of the proximal and middle sections. Further, the tie rod 46 is angled relative to the longitudinal axis of the auger tube, permitting the tie rod to translate the generally horizontal folding axis of auger sections 12 and 14 into a substantially vertical folding axis of auger section 16.

The hydraulic cylinder 32 is driven by a source of pressurized hydraulic fluid, not shown, and is controlled by control means, not shown, all in a fashion well known in the prior art.

There may further be provided a strap or other retaining means, not shown, to bundle the auger sections together in their fully folded positions.

The auger flightings 60 are rotatably journalled within their respective auger housings. The respective auger shafts 62 are releasably joined together by means of a keyway or other releasable drive coupling means, to communicate rotational drive from the first, drive auger flighting to second and subsequent, driven auger flightings. A first auger flighting, is rotatably driven by conventional drive means, not shown.

Although the invention has been described by way of a preferred embodiment thereof, it will be seen by those experienced in the prior art to which the invention pertains that numerous variations and departures from the described embodiment may be made, while still remaining within the spirit and scope of the present invention, as the present invention is defined in the appended claims.

We claim:

1. A conveyor apparatus comprising an elongate conveyor housing and material transport means within said housing, said conveyor comprising first, second and third conveyor sections pivotally joined together, foldable about first and second pivot means between an extended coaxial arrangement and a folded non-coaxial arrangement and forming when fully extended, a unitary conveyor;

first retraction means connected to said second section to fold said first and second sections about a first axis;

actuation means for driving said first retraction means;

second retraction means associated with said third section to fold said third section relative to said second section about a second axis;

linkage means associated with said first and second retraction means whereby actuation of said first retraction means by said actuation means synchronously drives said second retraction means to fold said third section relative to said second section; and said first and second pivot means comprising first and second hinge means angularly displaced from each other each of said hinge means comprising a pair of legs joined to a corresponding section, said legs being pivotally joined together at a position which is displaced from said conveyor housing for displacing said conveyor sections apart from each other when said hinge opens.

2. Apparatus as in claim 1, wherein said second axis is angularly displaced from said first axis by about 90°.

3. Apparatus as in claim 1, wherein said first retraction means is pivotally mounted at an end thereof to said first hinge at generally the apex thereof.

4. Apparatus as in claim 1, wherein said actuation means comprises a fluid-driven reciprocating cylinder and piston means.

5. Apparatus as in claim 1, wherein at least one of said first and second hinge means comprises a generally triangular structure.

6. Apparatus as in claim 1, wherein said linkage means comprises a tie rod having first and second ends, said first end pivotally mounted to said first conveyor section and said second end pivotally mounted to said third conveyor section.

7. Apparatus as in claim 6, wherein said tie rod is pivotally mounted at said first end to a mounting member fixedly mounted to said first conveyor section and extending distally outwardly therefrom.

8. An auger comprising an auger housing and an auger flighting, said auger being foldable in at least three sections, said auger comprising:

first retraction means associated with said first and second sections and operable between first and second positions whereby in said first position said first and second sections are fully extended and in said second position said sections are folded about a first axis;

actuator means associated with said first retraction means;

second retraction means associated with said third section and operable between first and second positions whereby in said first position said third auger section is fully extended to relative to said second section and in said second position, said third section is folded relative to said second section about a second axis;

linkage means associated with said first and second retraction means whereby actuation of said first retraction means by said actuator means synchronously said second retraction means between said first and second positions; and said first and second pivot means comprising first and second hinge means angularly displaced from each other each of said hinge means comprising a pair of legs joined to a corresponding section, said legs being pivotally joined together at a position which is displaced from said conveyor housing for displacing said conveyor sections apart from each other when said hinge opens.

9. Apparatus as in claim 8, wherein said second axis is rotationally displaced from said first axis by about 90°.

10. Apparatus as in claim 8, wherein said pivot means comprises first and second hinge means, said first and second hinge means each arranged for pivotal movement about a respective axis, the respective axes being angularly displaced from each other by about 90°.

11. Apparatus as in claim 8, wherein said first retraction means is pivotally mounted at an end thereof to said first hinge at generally the apex thereof.

12. Apparatus as in claim 8, wherein said linkage means comprises a tie rod having first and second ends, said first end pivotally mounted to said first section and said second end pivotally mounted to said third section.

13. Apparatus as in claim 8, wherein said actuator comprises a fluid-driven reciprocating cylinder.

14. Apparatus as in claim 8, wherein at least one of said first and second hinge means comprises a generally triangular structure.

* * * * *